United States Patent
Rödbro et al.

(10) Patent No.: US 10,116,715 B2
(45) Date of Patent: Oct. 30, 2018

(54) ADAPTING ENCODED BANDWIDTH

(71) Applicant: Microsoft Technology Licensing, LLC, Redmond, WA (US)

(72) Inventors: Christoffer Asgaard Rödbro, Stockholm (SE); Andreas Bergkvist, Stockholm (SE); Andrei Jefremov, Jarfalla (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 14/701,406

(22) Filed: Apr. 30, 2015

(65) Prior Publication Data

US 2016/0277468 A1 Sep. 22, 2016

(30) Foreign Application Priority Data

Mar. 16, 2015 (GB) ................................... 1504403.5

(51) Int. Cl.
*G06F 15/16* (2006.01)
*H04L 29/06* (2006.01)

(52) U.S. Cl.
CPC .......... *H04L 65/60* (2013.01); *H04L 65/1066* (2013.01)

(58) Field of Classification Search
USPC ........................................................ 709/228
See application file for complete search history.

(56) References Cited

U.S. PATENT DOCUMENTS 5,148,274 A * 9/1992 Knauer .................. H04N 7/015
                                                        348/469
5,442,630 A * 8/1995 Gagliardi ............ H04L 12/4612
                                                        370/397

(Continued)

FOREIGN PATENT DOCUMENTS

CN          101378579       11/2012
EP           2605582         6/2013

(Continued)

OTHER PUBLICATIONS

"International Search Report and Written Opinion", Application No. PCT/US2016/022397, dated Jun. 2, 2016, 15 pages.

(Continued)

*Primary Examiner* — Alicia Baturay
(74) *Attorney, Agent, or Firm* — Schwegman Lundberg & Woessner, P.A.

(57) ABSTRACT

A method comprising: conducting a communication session between a first terminal and a second terminal, the session comprising transmitting an encoded bitstream from an encoder of the first terminal over a channel to the second terminal; measuring a bandwidth capacity experienced over the channel at multiple different times, thereby collecting a history of bandwidth measurements for the channel; based on the history of bandwidth measurements, obtaining at least a selected upper bandwidth constraint for the encoded bitstream; and during the session, dynamically adapting an encoded bandwidth with which to encode the bitstream, by dynamically selecting the encoded bandwidth based on one or more current conditions of the channel, but constrained by at least said upper bandwidth constraint.

17 Claims, 2 Drawing Sheets

(56) References Cited

U.S. PATENT DOCUMENTS

| | | | | |
|---|---|---|---|---|
| 5,444,703 A * | 8/1995 | Gagliardi | H04Q 11/0457 | 370/401 |
| 5,574,861 A * | 11/1996 | Lorvig | H04Q 11/0428 | 370/410 |
| 6,118,817 A * | 9/2000 | Wang | H04N 19/147 | 375/240.03 |
| 6,256,309 B1 * | 7/2001 | Daley | H04L 45/12 | 370/395.43 |
| 6,292,834 B1 * | 9/2001 | Ravi | H04L 29/06027 | 375/E7.004 |
| 6,331,986 B1 * | 12/2001 | Mitra | H04Q 3/0091 | 370/232 |
| 6,359,862 B1 * | 3/2002 | Jeffries | H04L 12/5602 | 370/232 |
| 6,650,624 B1 * | 11/2003 | Quigley | H04J 3/1694 | 370/252 |
| 6,772,217 B1 * | 8/2004 | Baumann | H04L 47/10 | 370/395.41 |
| 6,813,244 B1 | 11/2004 | He et al. | | |
| 6,891,798 B1 | 5/2005 | Yip et al. | | |
| 6,891,810 B2 * | 5/2005 | Struhsaker | H01Q 1/246 | 370/294 |
| 6,909,726 B1 * | 6/2005 | Sheeran | H04L 12/2801 | 370/395.41 |
| 6,983,327 B2 * | 1/2006 | Koperda | H04J 3/1694 | 348/E7.07 |
| 7,002,929 B2 * | 2/2006 | Struhsaker | H04W 72/1252 | 370/280 |
| 7,010,598 B2 * | 3/2006 | Sitaraman | H04L 43/00 | 709/224 |
| 7,016,409 B2 * | 3/2006 | Unger | H04N 21/2343 | 375/240.02 |
| 7,020,193 B2 * | 3/2006 | Van Der Schaar | H04N 21/2662 | 375/240.01 |
| 7,047,309 B2 * | 5/2006 | Baumann | H04L 47/10 | 370/395.41 |
| 7,120,123 B1 * | 10/2006 | Quigley | H04J 3/0682 | 370/252 |
| 7,139,283 B2 * | 11/2006 | Quigley | H04J 3/1694 | 370/432 |
| 7,173,916 B2 * | 2/2007 | Struhsaker | H04L 5/0005 | 370/329 |
| 7,230,931 B2 * | 6/2007 | Struhsaker | H01Q 1/246 | 370/280 |
| 7,353,114 B1 * | 4/2008 | Rohlf | G06F 17/2247 | 702/5 |
| 7,609,637 B2 * | 10/2009 | Doshi | H04L 47/825 | 370/235 |
| 7,680,038 B1 * | 3/2010 | Gourlay | H04L 41/0896 | 370/230 |
| 7,725,576 B2 * | 5/2010 | Sitaraman | H04L 65/80 | 709/224 |
| 7,818,444 B2 * | 10/2010 | Brueck | H04L 29/06027 | 709/231 |
| 7,843,824 B2 * | 11/2010 | Wu | H04J 3/1688 | 370/230.1 |
| 7,898,951 B2 | 3/2011 | Koba et al. | | |
| 7,958,229 B2 * | 6/2011 | Conway | G06F 1/3203 | 709/224 |
| 7,990,145 B2 * | 8/2011 | Boef | G01R 33/3621 | 324/318 |
| 7,991,713 B2 * | 8/2011 | Triantafillidis | H04L 47/823 | 706/14 |
| 8,014,273 B1 * | 9/2011 | Barrett | H04L 41/0896 | 370/210 |
| 8,149,771 B2 * | 4/2012 | Khivesara | H04L 12/1881 | 370/230 |
| 8,229,888 B1 * | 7/2012 | Roskind | H04N 21/25808 | 707/611 |
| 8,271,647 B2 * | 9/2012 | Conway | G06F 1/3203 | 709/224 |
| 8,311,102 B2 * | 11/2012 | Lu | H04N 21/23424 | 375/240.1 |
| 8,321,534 B1 * | 11/2012 | Roskind | H04N 21/25808 | 348/194 |
| 8,355,735 B2 | 1/2013 | De Pasquale et al. | | |
| 8,565,113 B2 | 10/2013 | Dhanapal | | |
| 8,566,395 B2 * | 10/2013 | Shi | H04L 65/4084 | 709/202 |
| 8,588,210 B2 * | 11/2013 | Newberg | H04L 29/06027 | 370/352 |
| 8,634,431 B1 * | 1/2014 | Chiang | H04Q 11/0067 | 370/249 |
| 8,705,400 B2 | 4/2014 | Jeong et al. | | |
| 8,705,616 B2 * | 4/2014 | He | H04N 19/436 | 375/240.02 |
| 8,737,335 B2 | 5/2014 | Konishi et al. | | |
| 8,750,239 B1 * | 6/2014 | Martini | H04L 47/76 | 370/329 |
| 8,804,508 B1 * | 8/2014 | Hobbs | H04N 21/2402 | 370/230 |
| 8,817,645 B2 | 8/2014 | Rui et al. | | |
| 8,838,722 B2 * | 9/2014 | Ridges | H04N 21/41407 | 709/204 |
| 8,838,828 B2 * | 9/2014 | Ramalho | H04N 21/2402 | 370/230 |
| 8,843,656 B2 * | 9/2014 | Gahm | H04L 65/4092 | 709/234 |
| 8,971,282 B2 * | 3/2015 | Martini | H04L 47/76 | 370/329 |
| 9,014,030 B2 * | 4/2015 | Struhsaker | H01Q 1/246 | 370/252 |
| 9,049,271 B1 * | 6/2015 | Hobbs | H04L 47/25 | |
| 9,100,214 B1 * | 8/2015 | Joseph | H04L 12/4641 | |
| 9,106,887 B1 * | 8/2015 | Owen | H04N 19/102 | |
| 9,118,806 B2 * | 8/2015 | Bright-Thomas | H04N 7/152 | |
| 9,130,697 B2 * | 9/2015 | Struhsaker | H04L 5/0005 | |
| 9,197,579 B2 * | 11/2015 | Martini | H04L 47/76 | |
| 9,215,269 B2 * | 12/2015 | Freeman, II | H04L 67/10 | |
| 9,270,784 B2 * | 2/2016 | Ridges | H04L 65/403 | |
| 9,270,944 B2 * | 2/2016 | Brooks | H04N 7/17318 | |
| 9,351,024 B2 * | 5/2016 | Ramalho | H04N 21/2402 | |
| 9,363,029 B2 * | 6/2016 | Struhsaker | H01Q 1/246 | |
| 9,386,404 B1 * | 7/2016 | Emigh | H04N 21/25808 | |
| 9,401,944 B2 * | 7/2016 | Gogoi | H04N 21/234327 | |
| 9,497,513 B2 * | 11/2016 | Unger | H04N 21/2343 | |
| 9,549,023 B2 * | 1/2017 | Ridges | H04N 21/41407 | |
| 9,712,590 B2 * | 7/2017 | Zhang | H04L 65/607 | |
| 9,794,601 B2 * | 10/2017 | Li | H04N 21/234381 | |
| 9,906,454 B2 * | 2/2018 | Prakash | H04L 69/16 | |
| 2006/0095943 A1 | 5/2006 | Demircin et al. | | |
| 2010/0080142 A1 | 4/2010 | Jeong et al. | | |
| 2011/0246622 A1 | 10/2011 | Pantos et al. | | |
| 2012/0050453 A1 | 3/2012 | Oike | | |
| 2012/0093500 A1 | 4/2012 | Shiba et al. | | |
| 2012/0259950 A1 * | 10/2012 | Havekes | H04L 65/4084 | 709/217 |
| 2012/0300658 A1 | 11/2012 | Sloyer et al. | | |
| 2013/0003594 A1 | 1/2013 | Amano et al. | | |
| 2013/0114415 A1 * | 5/2013 | Das | H04W 16/02 | 370/238 |
| 2013/0191508 A1 | 7/2013 | Strasman et al. | | |
| 2014/0149562 A1 | 5/2014 | Xiao et al. | | |
| 2014/0247834 A1 | 9/2014 | Poulsen | | |
| 2014/0254613 A1 | 9/2014 | Lloyd et al. | | |
| 2014/0273990 A1 | 9/2014 | Rödbro et al. | | |
| 2014/0337518 A1 | 11/2014 | Garcia et al. | | |
| 2015/0103646 A1 * | 4/2015 | Tourrilhes | H04L 47/125 | 370/229 |
| 2015/0249580 A1 * | 9/2015 | Cory | H04L 67/141 | 709/226 |
| 2015/0373582 A1 | 12/2015 | Valliappan et al. | | |
| 2016/0072723 A1 * | 3/2016 | Shanmuganathan | H04L 47/76 | 709/226 |
| 2016/0080207 A1 * | 3/2016 | Prakash | H04L 69/16 | 370/231 |
| 2016/0105523 A1 * | 4/2016 | Dowdell | H04L 45/306 | 709/230 |

(56) References Cited

U.S. PATENT DOCUMENTS

| | | | | |
|---|---|---|---|---|
| 2016/0196089 | A1* | 7/2016 | Gadre | G06F 3/0647 |
| | | | | 711/114 |
| 2016/0219248 | A1* | 7/2016 | Reznik | H04N 21/2343 |
| 2016/0234504 | A1* | 8/2016 | Good | H04N 19/146 |
| 2016/0277467 | A1* | 9/2016 | Rodbro | H04L 65/1069 |

FOREIGN PATENT DOCUMENTS

| | | | | |
|---|---|---|---|---|
| EP | | 2797268 A1 * | 10/2014 | H04L 45/306 |
| WO | WO-2011076737 | | 6/2011 | |
| WO | WO-2014028672 | | 2/2014 | |
| WO | WO-2014159301 | | 10/2014 | |
| WO | WO-2015010954 | | 1/2015 | |
| WO | WO-2016054306 | | 4/2016 | |

OTHER PUBLICATIONS

"Dynamic Bandwidth Management Using Container LSP Overview", Retrieved From: <http://www.juniper.net/techpubs/en_US/junos14.2/topics/concept/dynamic-bandwidth-management-overview.html> Mar. 26, 2015, Mar. 15, 2015, 20 pages.

Eskandari,"Quality of Service Optimization for Network-on-Chip Using Bandwidth-Constraint Mapping Algorithm", In Proceedings of 21st Euromicro International Conference on Parallel, Distributed and Network-Based Processing, Feb. 27, 2013, 5 pages.

Sun,"Seamless Switching of Scalable Video Bitstreams for Efficient Streaming", Proceedings of the IEEE International Symposium on Circuits and Systems, vol. 3, May 26, 2002, 4 pages.

"International Search Report and Written Opinion", Application No. PCT/US2016/022399, dated Jun. 20, 2016, 11 pages.

"Network Bandwidth: Sizing for Long-Distance Storage Networking Applications", Retrieved from: <http://searchitchannel.techtarget.com/feature/Network-bandwidth-Sizing-for-long-distance-storage-networking-applications> Apr. 2, 2015, Nov. 10, 2006, 5 pages.

Bala,"Machine Learning Based Decision Making by Brokers in Cloud Computing", In Proceedings: In International Journal of Application or Innovation in Engineering & Management, vol. 3, Issue 7, Jul. 2014, 5 pages.

Uyeda,"Efficiently Measuring Bandwidth at All Time Scales", In Proceedings of the 8th USENIX Conference on Networked Systems Design and Implementation, Mar. 30, 2011, 14 pages.

Wang,"Timing is everything: Accurate, Minimum Overhead, Available Bandwidth Estimation in High-speed Wired Networks", In Proceedings of the Conference on Internet Measurement Conference, Nov. 5, 2014, 14 pages.

"International Preliminary Report on Patentability", Application No. PCT/US2016/022397, dated May 18, 2017, 16 pages.

"International Preliminary Report on Patentability", Application No. PCT/US2016/022399, dated Mar. 1, 2017, 7 pages.

"Non-Final Office Action", U.S. Appl. No. 14/700,837, dated Apr. 10, 2017, 39 pages.

"Second Written Opinion", Application No. PCT/US2016/022397, dated Feb. 22, 2017, 15 pages.

* cited by examiner

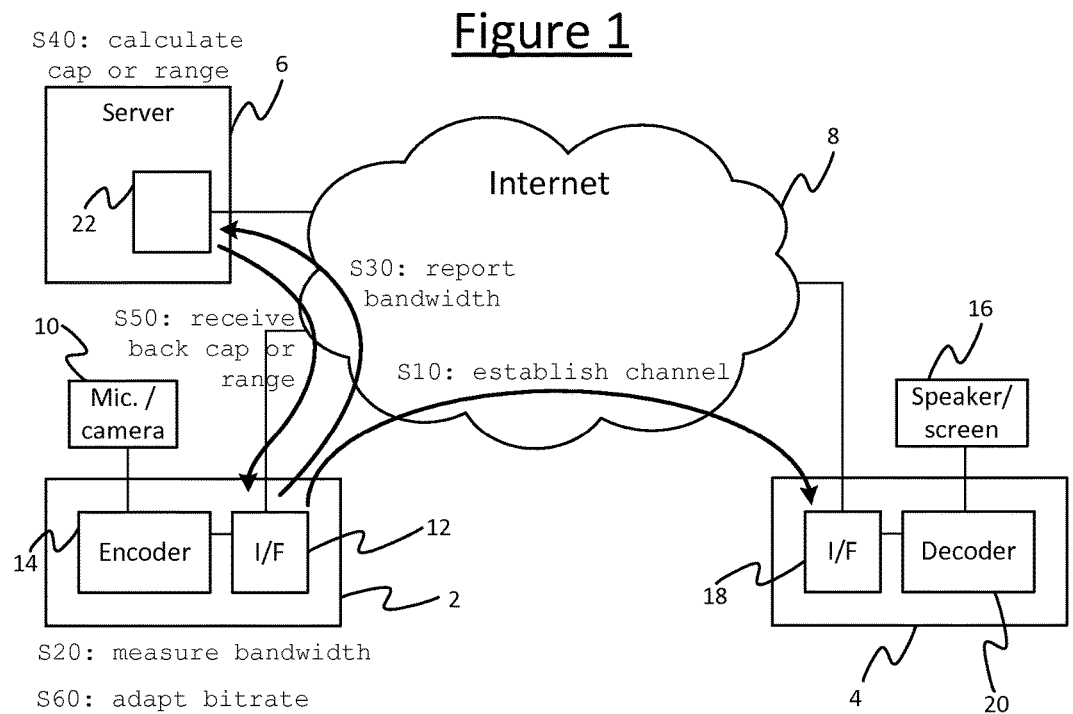
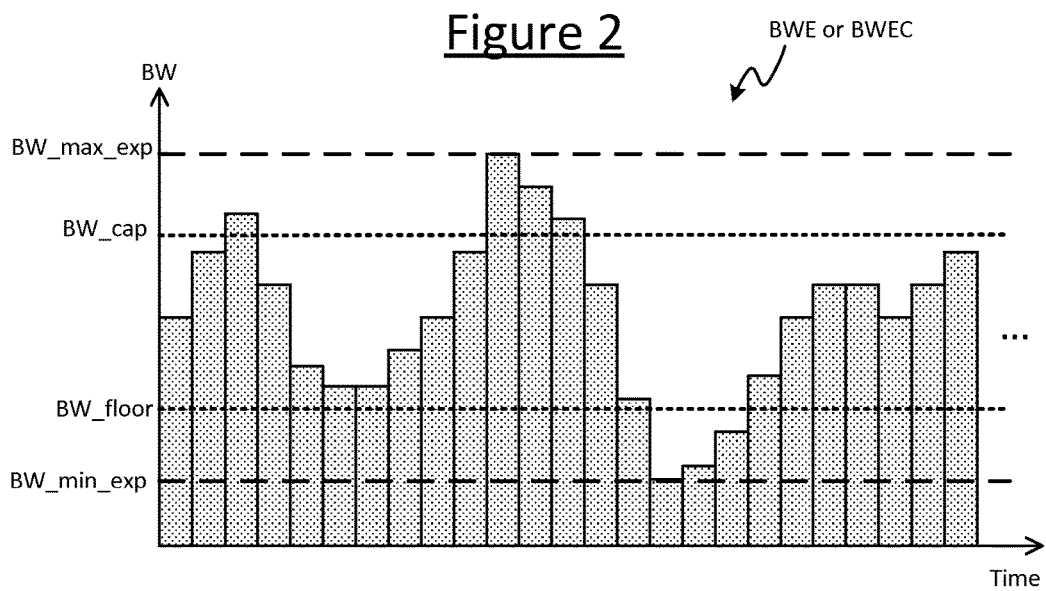

ADAPTING ENCODED BANDWIDTH

RELATED APPLICATION

This application claims priority under 35 USC 119 or 365 to Great Britain Application No. 1504403.5 filed Mar. 16, 2015, the disclosure of which is incorporated in its entirety.

BACKGROUND

There are various known techniques for measuring the bandwidth capacity of a channel between two communication end-points, such as a channel established between two user terminals over a communication network such as the Internet (the bandwidth capacity being the available bandwidth, i.e. the bandwidth the channel is able to offer the transmitting terminal). For instance, existing examples of techniques for measuring bandwidth capacity include packet pair probing, packet train probing, and Kalman filter based estimation.

It is also known to select the encoded bandwidth of an encoded bitstream in dependence on the bandwidth capacity of the channel over which that bitstream is to be sent (the encoded bandwidth being the bandwidth incurred by transmitting the encoded bitstream over the channel, i.e. the bitrate of the encoded stream). For example this could be used to select the encoded bitrate of a real-time audio or video stream, such as a live voice and/or video call being conducted over the Internet (a VoIP call—Voice and/or Video over Internet Protocol). The skilled person is aware of various ways in which the encoding of a bitstream such as an audio or video stream can be adjusted so as to control the bandwidth it incurs, e.g. by adjusting the resolution, adjusting the quantization granularity, adjusting the number of intra-frame encoded frames (key frames) relative to the number of inter-frame encoded frames, changing the inter and/or intra frame block prediction mode, adjusting the amount of redundant error protection information included in the stream, etc.

In order to select what value of bandwidth (incurred bitrate) to encode with, one method is to collect a history of past bandwidth capacity measurements experienced over a channel, then determine a probability density function (PDF) of the history, and take the bandwidth at a certain predetermined percentile of the PDF in order to give the bandwidth (bitrate) with which to encode the outgoing bitstream. However in this case, while the encoded bandwidth may adapt as the history is updated, this encoded bandwidth is nonetheless always the bandwidth at a fixed percentile that has been predetermined (always the Nth percentile where N is constant), and there is no greater flexibility to adapt the encoded bitrate above or below this percentile even if current instantaneous conditions would warrant it.

An alternative method is to have the encoded bitrate track an instantaneous estimate of the bandwidth currently experienced over the channel. This way the encoded bandwidth can dynamically adapt to current conditions.

SUMMARY

However, simply tracking the current, instantaneous bandwidth may come with one or more of its own issues. For instance, in real-time media communication systems, average throughput is a poor metric for perceptual quality—specifically, quickly variable bandwidth usage may lead to perceptually annoying artefacts. I.e. a rapidly varying (objective) quality, such as a rapidly varying resolution, is annoying to the user and therefore by attempting to always provide the highest objective quality the channel can support at any given instant, this may paradoxically result in a worse perceptual (subjective) quality in terms of user experience. Moreover, for real-time and other types of stream, if the underlying available bandwidth is varying quickly, such as is common on mobile networks or indeed other types of network, then following an up-going bandwidth trend too readily may lead to congestion problems when the bandwidth drops again.

Hence the maximum or instantaneous bandwidth experienced over the channel does not necessarily mean much, as the bandwidth experienced at one given moment in time may be only an anomalous peak and not be representative of conditions more generally. Hence there is in fact some advantage in taking into account a broader history of bandwidth measurements. On the other hand, the technique of simply picking a certain percentile of the PDF of historical measurements, and sticking to the bandwidth of that percentile as the encoded bitrate no matter what, is rather too inflexible when the current bandwidth capacity of the channel drops below the predetermined percentile value (as it inevitably will at times) then the encoder will attempt to use a bandwidth that is currently unavailable and hence encounter congestion, leading to issues such as delay or packet loss; but on the other hand if the percentile is chosen too low to try to avoid this, then the encoder will often fail to take full advantage of the capacity of the channel when conditions are good.

Therefore, in the present disclosure, there is provided a trade-off based on calculating a bandwidth range to operate within. This is a variant of the technique whereby the encoder can adapt dynamically based on the current, instantaneous conditions of the channel, but recognizing that there will also be some reasonable value of encoded bandwidth whereby the quality is already acceptable, and there is little benefit in increasing beyond that.

According to one aspect disclosed herein, there is provided a method of conducting a communication session between a first terminal and a second terminal (e.g. two user terminals such as desktop or laptop computers, tablets or smartphones, or any combination of these). The session comprise transmitting an encoded bitstream from an encoder of the first terminal over a channel to the second terminal (for example the stream may comprise a real-time audio or video session, e.g. the session being a live voice and/or video call; and the channel may be established over a network such as the Internet). The method comprises: measuring a bandwidth capacity experienced over the channel at multiple different times, thereby collecting a history of bandwidth measurements for the channel; and based on the history of bandwidth measurements, obtaining at least a selected upper bandwidth constraint for the encoded bitstream. During said session, the encoded bandwidth of the bitstream is adapted dynamically, by dynamically selecting the encoded bandwidth based on one or more current conditions of the channel, but constrained by at least said upper bandwidth constraint. Optionally, the method may further comprise obtaining a selected lower bandwidth constraint for the encoded bitstream (also based on the history of bandwidth measurements), such that the dynamic selection of the encoded bandwidth is further constrained by said lower bandwidth constraint.

In embodiments, the upper bandwidth constraint is a maximum cap (and/or if used, the lower bandwidth constraint is a minimum bandwidth floor), thereby allowing the transmitting or receiving terminal to select the encoded bandwidth from within a range up to the maximum bandwidth cap (or from down to the minimum floor up to the maximum cap), but not beyond. Alternatively the upper and/or lower constraints could be soft constraints (explained later), but by way of example embodiments below may be explained in terms of a cap and floor.

The cap is artificially selected from the history, rather than just being the maximum bandwidth experienced in the history by default. The method allows the freedom to choose a cap less than the maximum experienced bandwidth in the history, e.g. a certain percentile of the bandwidth history such as the 50% percentile. On any given occasion the cap could happen to be selected to be the same as the maximum experienced bandwidth, but is not constrained to being so. The encoder is then free to choose what bandwidth to use within a range up to the cap, but cannot go beyond that range (even if any instantaneous bandwidth estimate happens to fall outside of this range at any given moment in time). This selection is adapted dynamically during the session, based on one or more additional criteria other than just the history—in embodiments, at least based on the instantaneous estimate of the current bandwidth measured over the channel. For instance, the bandwidth may be selected as the minimum of the cap and the current instantaneous bandwidth estimate.

Optionally, the method may also comprise obtaining a selected bandwidth floor for the range of bandwidths the encoder can choose from. Like the cap, this floor is artificially selected from the history, rather than just being zero or the minimum bandwidth experienced in the history by default. The method allows the freedom to choose a floor greater than zero or the minimum experienced bandwidth in the history, e.g. a certain percentile of the bandwidth history such as the 25% percentile while the cap is some higher percentile such as 75%. On any given occasion the floor could happen to be selected to be zero or the same as the minimum experienced bandwidth, but is not constrained to being so.

In embodiments, the cap and/or floor may optionally also be adapted (either during the session and/or between sessions). For example, the cap may be adapted based on meta-information about one or more of: a network over which the channel is established, media content of the bitstream, the encoding of the bitstream, the first terminal, the second terminal, one or more circumstances in which media content of the bitstream was captured at the first terminal, and/or one or more circumstances in which media content of the bitstream is to be played out at the second terminal. Or as another example, the bandwidth history may be updated in an ongoing manner during the session, and the maximum bandwidth cap may be adapted in dependence on the updated history.

In further embodiments, the method is performed by the first terminal, and said obtaining of the selected maximum bandwidth cap and/or the selected minimum bandwidth floor may comprise: submitting information from the first terminal to a server, the information comprising at least said bandwidth history; and in response to said submission, receiving back at the first terminal, from the server, the maximum bandwidth cap and/or minimum bandwidth floor, having been selected by the server based on the submitted information.

Thus the calculation for selecting the cap is offloaded to a server (e.g. in the cloud—note that a server herein refers to a logical server which may comprise one or more individual server units at one or more geographical sites). In embodiments, this can allow opportunities for online adaption or even machine learning to be applied the calculation mechanism. That is, the adaptation of the cap (whether between sessions and/or during a session), can be performed by the server; and in embodiments, machine learning techniques can be additionally applied to this adaptation, either to learn how to adapt better to the bandwidth history or to adapt better to the meta-information. Moreover, as the server only has to calculate a bandwidth range rather than an absolute bandwidth, the real-time constraint of the calculation is greatly reduced, making it more feasibly to apply online adaptation and/or machine learning (this is particularly but not exclusively relevant for media encoding).

In embodiments, the machine-learning algorithm will seek to optimize the quality of the session (e.g. call quality) by adapting the bandwidth range calculation; i.e. by adapting the bandwidth cap and/or floor, e.g. in terms of the upper and/or lower histogram percentiles as discussed above, optionally taking into account meta-information as well. Training data can be obtained in an ongoing manner from a plurality of past sessions, e.g. in the form of call quality scores being obtained directly through user scoring, or indirectly by mapping one or more technical parameters such as packet loss, roundtrip times, and/or encoding bandwidth to an estimate of call quality. As for the choice of the machine learning algorithm there are many options available in the art, for instance Simulated Annealing is known for its general applicability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section or elsewhere herein.

BRIEF DESCRIPTION OF THE DRAWINGS

To assist understanding of the present disclosure and to show how embodiments may be put into effect, reference is made by way of example to the accompanying drawings in which:

FIG. 1 is a schematic block diagram of a communication system,

FIG. 2 is a schematic representation of a bandwidth history,

DETAILED DESCRIPTION

Figure 3:
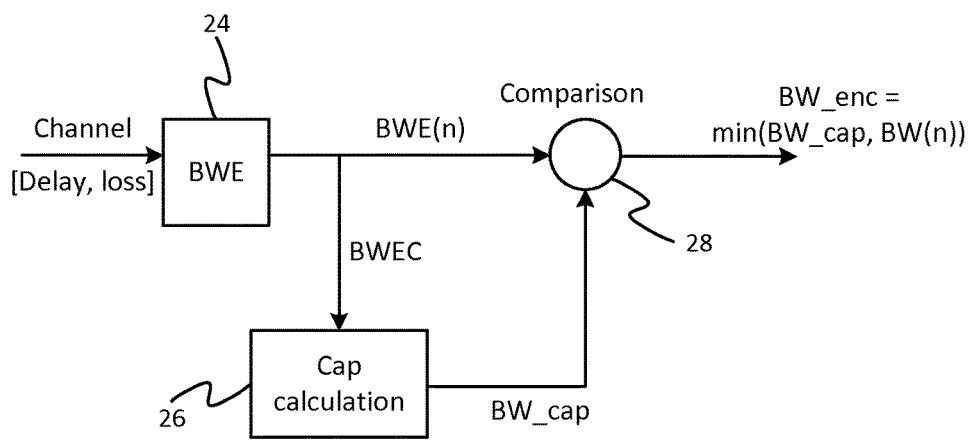
FIG. 3 is a schematic representation of a bandwidth adaptation algorithm.

FIG. 1 shows an example communication system in which embodiments of the present disclosure may be implemented. The system comprises a first user terminal 2, a second user terminal 4, and a server 6 each connected to a network 8, in embodiments a wide-area internetwork such as that commonly referred to as the Internet. Each of the first and second terminals 2, 4 may take any suitable form such as a desktop computer, laptop computer, tablet, smartphone, smart TV or set-top box (and the two terminals 2, 4 don't necessarily have to be of the same type). The server 6 may take the form of one or more server units located at one or more geographical sites. In the case of multiple server units at multiple sites, this kind of arrangement is sometimes referred to as "the cloud".

The first terminal 2 comprises a wired or wireless network interface 12 enabling it to at least communicate with the server 6 and the second terminal 4 over the network 8. Similarly the second terminal 4 comprises a network interface 18 enabling it to communicate with at least the first terminal 2 over the network 8. For example each of the interfaces 12, 18 may comprise a wired modem connecting to the Internet, or a short-range wireless transceiver for connecting to the Internet 8 via a wireless local area network (WLAN), or a cellular transceiver for connecting to the Internet 8 via a mobile cellular network.

The first terminal 2 also comprises an encoder 14 operatively coupled to the respective network interface 12 of the first terminal 2, and the second terminal 4 comprises a complementary decoder 20 operatively coupled to its respective network interface 18. The first terminal further comprises or is connected to one or more media input devices 10, e.g. a microphone and/or video camera. Either or both of these could be incorporated internally into the same housing as the first terminal 2, or else they could be external peripherals. Either way, the encoder 14 is operatively coupled to the input device(s) 10 so as to receive a bitstream from the input device(s) 10, comprising an audio and/or video stream. The encoder 14 is configured to encode this using known audio and/or video encoding techniques which (in themselves) will be familiar to a person skilled in the art, and transmits the encoded bitstream to the decoder on the second terminal over a channel established via the network interface 12 of the first terminal 2, the network 8 and the network interface 18 of the second terminal. The decoder 20 is operatively coupled to one or more media output devices 16 such as a speaker and/or screen. Either or both of these could be incorporated internally into the same housing as the second terminal 4, or else they could be external peripherals. The decoder 20 is configured to decode the encoded bitstream received from the encoder 14 using complementary techniques to those used by the encoder 14, and outputs the decoded audio and/or video to be played out through the output device(s) 16.

Thus the first terminal is able to conduct a commutation session with the second terminal in order to communicate user content. In embodiments, the bistream is a real-time audio and/or video stream, e.g. sent as part of a live voice and/or video call, or an Internet-based TV or radio service.

As will be appreciated by a person skilled in the art, there are various techniques for controlling the bitrate of the encoded bitstream, for example by controlling any one or more of: the temporal resolution (for video or audio), the spatial resolution (for video), the frame size (for video), the quantization granularity of one or more properties (e.g. one or more of the colour space channels for video), the dynamic range of one or more properties (e.g. frequency range for audio), the number of intra-frame encoded frames (key frames) per unit relative to the number of inter-frame encoded frames (for video or audio), the inter and/or intra frame block prediction mode (for video), and/or the amount redundant error protection information included in the stream, (for audio or video), etc. A higher bitrate results in a better objective quality, i.e. less information is thrown away in encoding the bitstream (this may be quantified by comparing an encoded-then-decoded version of the data content with the original unencoded data content at the transmit side). However, on the other hand, a higher bitrate incurs more bandwidth when transmitted over the channel to the second terminal 4. The higher the incurred bandwidth (the "encoded bandwidth", i.e. the encoded bitrate), the higher the bandwidth capacity of the channel has to be in order to transmit the stream without experiencing issues such as delay or loss. These in turn may impact the objective quality experienced at the receive side (e.g. in the case of lost packets), or may result in other artefacts which affect the user's perception of the quality (e.g. delay may result in jitter).

For these reasons, it is known for the encoder 14 to be configured to measure the current bandwidth capacity of the channel, and to adapt the encoded bandwidth in order to try keep it approximately equal to the current capacity.

However, when the underlying channel exhibits variable capacity, and if the media encoding is done in accordance with instantaneous estimates of said capacity, then the media encoding bandwidth will also vary quickly. It is recognized herein that this in itself leads to perceptually annoying artefacts. For instance, if the user sees a rapidly varying quality (e.g. a rapidly varying resolution), this will be perceived by the user of the second terminal 4 as an artefact, rather than being perceived as achieving the "best" instantaneous quality. Moreover, if media encoding follows the channel capacity estimates, then channel congestion will occur every time the capacity drops due to the inherent round-trip time adaption delay. Such congestion leads to other perceptual annoying artefacts such as cut-outs and distortions.

It is not uncommon to introduce some kind of smoothing of the instantaneous capacity estimates. However, smoothing inherently leads to slowed reaction times, which can be very problematic when bandwidth drops.

Moreover, tuning the parameters of bandwidth control mechanisms is a complicated matter that requires a lot of trial-and-error, as well as online learning if multiple user's data is to be taken into account.

The following provides a method which reduces the real-time constraint of the online calculations, thereby allowing a server-based (e.g. cloud-based) solution that is much more suitable for online learning.

The method works based on estimates of the bandwidth capacity experienced over the channel between the first and second terminals 2, 4. These estimates in themselves may be produced by any suitable bandwidth measurement technique known in the art. For instance, the technique(s) used here to measure the estimated bandwidth capacity may comprise packet pair probing, packet train probing, and/or a Kalman filter based estimation.

As illustrated by way of example in FIG. 2, a plurality of these bandwidth capacity estimates are collected over time to form a time series or "history" of bandwidth estimates, labelled herein as BWE, where BWE(n) is the estimate at a given time n. From this time series, the method calculates a bandwidth range [BW_cap, BW_floor] in which the communication application shall operate. That is, the bandwidth history such as that illustrated in FIG. 2 is used to select a range of bandwidths from BW_floor to BW_cap, within which—but not outside of—the encoder 14 is allowed to vary its encoded bitrate (encoded bandwidth) based on channel conditions. The history as used to calculate this range may be the total history collected since the channel was established, or the history over only a certain time window, e.g. a predetermined time window leading up to the current time n, such as the last 1 second, or the last 10 seconds, or the last 100 seconds (or any value chosen between any pair of these values).

The range is defined at least in terms of an upper bandwidth cap BW_cap. For example, this may be selected as a certain fraction or percentage of the maximum experienced bandwidth BW_max_exp, or a certain percentile P of the experienced bandwidth distribution (the bandwidth corresponding to the Pth percentile is the bandwidth below which P percent of the measurements fall).

As for the lower end of the range BW_floor, in a simplest embodiment it is simply 0. That is, to enforce no minimum bandwidth floor. Alternatively, it may be non-zero. For example BW_floor may be calculated following the same principles as BW_cap, but using a lower percentage or fraction of the maximum experienced bandwidth BW_max_exp, or a lower percentile of the experienced bandwidth distribution.

Alternatively or additionally, the bandwidth floor may be calculated in dependence of one or more pieces of meta information. E.g. from a large amount of data, it may be discovered that in a certain scenario call quality becomes intolerable at encoding rates below a certain threshold. In this case, there is little reason to ever encode at a lower rate because the call in question would never be of acceptable quality, and therefore, the floor is set at that particular threshold. Some examples are discussed in more detail shortly.

Whether set based on a percentile or meta-information, or a combination of these, note that the upper bandwidth cap BW_cap is not in general the same as the highest experienced bandwidth in the history. Also, the lower bandwidth floor BW_floor is not in general necessarily the same as zero or the lowest experienced bandwidth in the bandwidth history (though in some embodiments it may be set as such).

Once the allowed bandwidth range [BW_floor, BW_cap] is determined, the encoder 14 can then dynamically adapt the bandwidth (bitrate) of the encoded media bitstream that it generates and transmits to the second, receiving user terminal 4. By dynamically, it is means adapting during the session, "on-the-fly" in response to one or more current channel conditions as-and-when those conditions change. In embodiments, this means adapting the current encoded bandwidth at least based on the current estimate of the instantaneous bandwidth measurement for the channel, i.e. the most recent value BWE(n) in the BWE time series (of course any measurement takes a finite amount of time, but in a series of measurements each taken at a respective one of a series of discrete time units 1 . . . n, the "instantaneous" measure is the measure from a given one of the time units rather than multiple of them, and the current instantaneous measure is that taken in the most recent time unit n).

In one particular exemplary embodiment, the value of the encoded bandwidth used by the encoder 14 is determined by:

$$\min(BW\_cap, \max(BW\_floor, BWE(n))).$$

In case of the floor being equal to 0, the max term in the above equation becomes equal to BWE(n), so the value of the encoded bandwidth used by the encoder 14 is determined by:

$$\min(BW\_cap, BWE(n))$$

Figure 4:
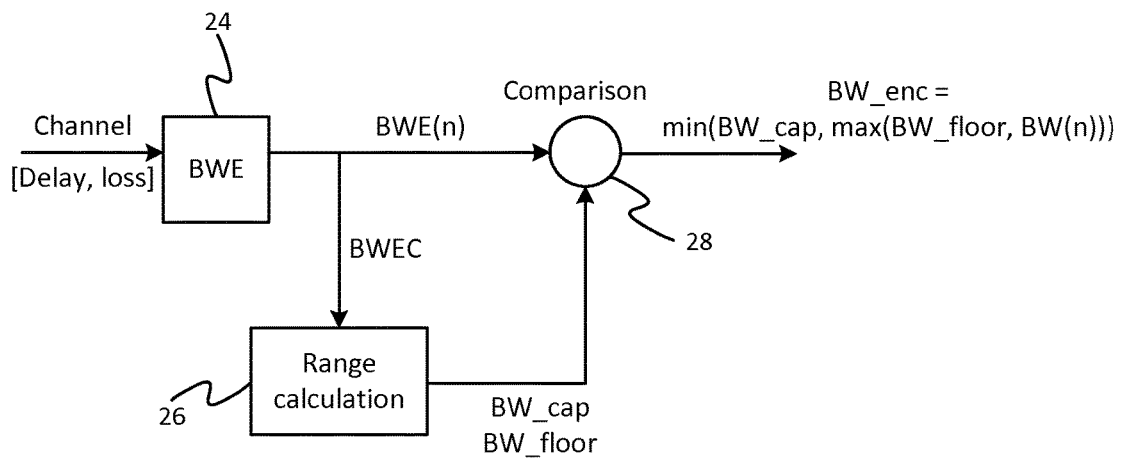
FIG. 4 is a schematic representation of another bandwidth adaptation algorithm.

This is illustrated schematically in FIGS. 3 and 4: a bandwidth estimation block 24 measures the bandwidth estimates BWE at times 1 . . . n, and supplies a history of these bandwidth measurements to a cap or range calculation block 26, which uses the collected history of estimates BWE to calculates a bandwidth cap BW_cap or range [BW_floor, BW_cap]. A comparison block 28 compares the current (most recent) bandwidth estimate BWE(n) to the calculated cap, and computes the current bandwidth BW_enc to use for the encoding based on one of the expressions shown above.

In terms of implementation, the BWE values may be produced on the receiving side 4 or the transmitting side 2 of the communication system. The bandwidth cap or range [BW_cap, BW_floor] is calculated in dependence of the BWE time series, and the calculation of this may be carried out at the receiving side 4, the transmitting side 2, or at a separate dedicated location 22, such as at a server. The latter allows online adaption of the BWE→[BW_floor, BW_cap] calculation mechanism.

An exemplary implementation is show in FIGS. 3 and 4. Here, the bandwidth estimation block 24 is implemented in the encoder 14 or in a feedback mechanism at the decoder side 20, while the cap or range calculation block 26 is implemented in a control module 22 at the server 6. The comparison block 28 is implemented at the encoder 14, but could alternatively be implemented as part of the feedback mechanism at the decoder 20 (or potentially even as part of the control module 22 at the server 6, in which case the encoder 14 or decoder 20 would have to report the instantaneous bandwidth measurement to the server 6, though this may reintroduce real-time issues as the encoder/decoder may not be able to back off or adapt quickly within the selected range any more). Each of the encoder 14, decoder 20 and control module 22 may be implemented in the form of software code embodied on a non-transitory computer-readable storage device comprising one or more storage media (e.g. a magnetic medium such as a hard disk, electronic medium such as an EEPROM or an optical disk such as a CD-ROM), configured to run one on a processing apparatus comprising one or more processing units of the first terminal 2, second terminal 4 and server 6 respectively. Alternatively it is not excluded that one or more of these modules 14, 20, 22 could be implemented in dedicated hardware circuitry, or a combination of hardware and software.

In operation, (referring also to FIG. 1) at step S10 the first terminal 2 and second terminal 4 establish a channel between them over the network 8 (e.g. Internet). At step S20, the encoder 14 measures the bandwidth over the channel (block 24). At step S30 the encoder 14 transmits the measurements from the first terminal 2 to the control module 22 on the server 6, over the network 8 (or potentially even via some separate means). The encoder 14 could send the bandwidth measurements to the server 6 one-at-a-time as they are obtained, or could collect a plurality of the measurements together into the history before they are sent (i.e. steps S20 and S30 could be one after another or could be interleaved). Either way, at step S40, the control module 22 at the server 6 calculates the bandwidth cap BW_cap or range [BW_floor, BW_cap] (block 26). At step S50, the control module 22 returns the estimated cap or range back from the server 6 to the encoder 14 on the first terminal 2. At step S60, the encoder 14 selects the bandwidth to use to transmit over the channel to the second terminal 4, limited by the returned cap or range.

In one embodiment, the time series BWE is compacted into BWEC as an intermediate step before calculating [BW_floor, BW_cap]. That is, the bandwidth history is quantized before being used to calculate the cap or range. This is especially relevant when offloading the calculation to a server 6 because it reduces the bandwidth consumption from transmitting the time series to the server 6. One such compaction is a histogram of the values in BWE. Of course in a digital system even the original estimates BWE are discrete and so could be described as a histogram as shown in FIG. 2, but the compacted estimates BWEC are quantized further into coarser bins and/or coarser horizontal resolution, coarser than the original granularity of the obtained bandwidth estimates BWE.

The history or histogram should primarily reflect the most recent values in the BWE time series, for example, the last 1 minute. Or, the history or histogram may be recursively updated using 1st order smoothing with an appropriate time constant, corresponding to, for example 1 minute.

Note also, instead of building BWE/BWEC from scratch for each media session, the values from one or more previous sessions may be recorded, either at the media endpoints 2, 4 or at the server 6, and used in the initial phase until a sufficient in-session history has been recorded.

The following now describes some examples of how to calculate BW_cap (and optionally BW_floor) from BWEC, or directly from recent (say 1 minute) values in BWE. In a simplest embodiment, BW_cap is simply a predetermined percentile, e.g. the 50% (=median), while BW_floor is fixed at 0; or BW_floor and BW_cap are both percentiles, e.g. 25% and 75% respectively. These can be readily calculated from BWE or BWEC.

In more advanced embodiments, the value of BW_cap (e.g. the percentile) or the values of BW_floor and BW_cap (e.g. percentiles) used may be calculated adaptively. This calculation may depend on any one or more of the following.
(i) Statistics of the BWE or BWEC history itself. For example, if bandwidth is generally low it may be desirable to use a percentile higher than 50%. This is because is BW_cap is chosen too low, media encoding quality will be poor, and it may therefore be better to accept a higher risk of channel overload in trade for better source coding quality. On the other hand, if bandwidth is generally high, it may be desirable to choose a lower percentile because bandwidth is already high enough to ensure acceptable media source coding quality, and increasing bandwidth further is not worth the increased risk of channel overload.
(ii) Meta-information about the network. For example, this may be the network type used for transmission (e.g. wireless 2G, wireless 3G, Wi-Fi, Ethernet, etc.). For instance, wireless channels are known to exhibit substantial capacity variation and therefore lower percentiles could be generally used for a wireless channel than for a non-wireless channel.
(iii) Meta-information about the first terminal 2 and/or second terminal 4, e.g. the screen size, or speaker fidelity of one or both of the terminals 2, 4. For instance this may comprise:
  display size—the encoding bandwidth desired to achieve acceptable perceptual quality increases with the displayed video size. Therefore, the percentile may be increased with the displayed video size;
  the video camera—the perceptual quality gain of increased encoding bandwidth depends on the quality of the capturing camera, and therefore the percentile may be chosen in dependence thereof; and/or
  the audio playout device—if the audio playout device is not capable of reproducing high frequency components, the bandwidth requirements are lower and thus a lower percentile may be used.
(iv) Meta-information about the media. This may comprise for example:
  the media type transmitted—video calls need more bandwidth than audio calls for acceptable quality, and therefore the former may use higher percentiles;
  temporary video activity—the more movement there is in the scene, the more bandwidth is required for acceptable encoding quality and therefore the percentile may be increased with temporal activity; and/or
  spatial activity—the more complicated the scene is, the more bandwidth is required for acceptable encoding quality and therefore the percentile may be increased with spatial activity.
(v) Meta-information about the circumstances in which the media was captured or will be played out. For example this may comprise:
  video lighting conditions—in poorly lit scenarios there is less perceptual quality gain when increasing encoding bandwidth, and therefore a lower percentile may be used; and/or
  viewing distance—the farther the viewer is from the display, the less sensitive he is to encoding quality. Therefore, the percentile may be decreased with the viewing distance increase. Viewing distance can be estimated from the local side video.

In embodiments, these calculations are performed at the server 6, and furthermore this may include applying machine learning to optimize the adaptation scheme. Training data for the machine learning can be obtained for example by user feedback of individual calls or sessions. Based on machine learning, the controller 22 at the server 6 can, over time, learn how to best adapt the bandwidth cap BW_cap or range [BW_floor, BW_cap] in order to approach an optimization of the selection of the cap or range based on the history and/or meta-information, optimized according to one or more defined criteria, e.g. user feedback scores.

In a decision-making process, machine learning works by defining some measure of quality to be optimized (or optimized towards), then receiving feedback on that measure of quality (i.e. receiving training data) following decisions made by the decision-making process which will have affected the quality. This is performed continually over multiple decisions, each time the machine-learning algorithm adjusting the decision-making process itself to try to make more optimal decisions in terms of the measure of quality. Given a defined measure to be optimized for and a set of training data, there are many choices of machine-learning algorithm available in the art, e.g. Simulated Annealing.

As applied to embodiments herein, the machine-learning algorithm would seek to optimize call quality by adapting the bandwidth range calculation; for example, it may adapt the upper and/or lower histogram percentiles as discussed above, optionally taking meta-information into account as well. The measure of quality may comprise (or be based on) user opinion scores (explicit, subjective feedback from the end-users). Alternatively or additionally, the measure of call quality may comprise (or be based on) one or more objective technical parameters such as packet loss, roundtrip time, and/or encoding bandwidth. Either way, such training data can be obtained continually over multiple user calls between many pairs or sets of users, and used to train the bandwidth-range selection process.

It will be appreciated that the above embodiments have been described only by way of example.

For example, the adaption of the cap or range to all these factors can be done in many ways and may have many parameters. Also, the percentile based scheme as assumed above is only one example of implementation, and in other embodiments the cap and/or floor may be expressed in other terms.

In general the upper bandwidth cap BW_cap is not the same as the highest experienced bandwidth in the history. In embodiments where the cap is adaptive it may happen to be chosen as such on any given occasion, but is not constrained to being so. Also, the maximum cap could even be selected higher than maximum experienced bandwidth in the history, if it is anticipated that the bandwidth may go higher. Regarding the lower bandwidth floor BW_floor, this is not in general necessarily zero or the same as the lowest experienced bandwidth in the bandwidth history. In some embodiments it may be set to zero, or in embodiments where the floor is adaptive it may happen to be zero or the lowest experienced bandwidth on any given occasion, but is not constrained to being so.

Further, within the selected bandwidth range, the encoded bandwidth (bitrate) selected by the encoder 14 could alternatively or additionally be adapted based on one or more other channel conditions apart from the current bandwidth measurement, e.g. a current error rate, delay, jitter, etc. experienced over the channel.

Further, note that the information used to compute the cap (whether the meta-information or the history) is not necessarily received from the transmitter 2 in all possible embodiments. For instance, alternatively or additionally, meta-information such as information on the screen size of the receiving terminal 4, or other information such as a history of bandwidth measurements collected at the receiver 4, could be sent to the server 6 from the receiver 4 rather than the transmitter 2. Also, note that where it is said that the sever sends the cap and/or floor to the transmitting terminal 2, this could mean the server 6 sends the cap and/or floor directly to the transmitter 2, or indirectly via the receiving terminal. E.g. the receiver 4 could send the histogram and/or meta information to the server 6, and then the server 6 could return the cap BW_max (and optionally BW_floor) to the receiving terminal 4, and the receiving terminal 4 could then return the cap (and optionally the floor) to the transmitting terminal 2. Or in yet another variant, the receiving terminal could even compute the encoded bandwidth—e.g. min(BWE(n), BW_max)—at the receiving terminal 4 and return this to the transmitting terminal 2 to be used by the encoder 14.

Further, the encoded bandwidth does not necessarily have to be selected according to min(BW_cap, BWE(n)) or min(BW_cap, max(BW_floor, BWE(n))), and other relationships could also take advantage of the capping scheme disclosed herein. For instance, the value of the encoded bandwidth may be selected from within a range whereby the upper bound is defined by a "soft" function of both the "maximum" cap and the current bandwidth (rather than being a hard selection of one or the other), and optionally similarly for the lower bound. E.g. the bandwidth may be selected from a range up to softmax, and optionally down to softmin, where:

$$\text{softmax} = \log(\exp(BW\_floor) + \exp(BWE(n)))$$

and $$\text{softmin} = -\log(\exp(-BW\_cap) + \exp(-BWE(n)))$$

Furthermore, the techniques disclosed herein can be applied to other types of media, not just VoIP. In alternative embodiments, the encoded bitstream could be other forms of audio, video or other stream such as a live online TV or radio stream, or video game data stream; or in yet further embodiments the stream need not necessarily even be a live or real-time stream, and could instead be for example a file transfer (e.g. if there is real-time media sharing the same channel).

Other variants or applications of the disclosed techniques may become apparent to a person skilled in the art given the teachings herein. The scope of the present disclosure is not limited by the described embodiments, but only by the accompanying claims.

The invention claimed is:

1. A method of determining an encoding rate, comprising:
   determining a plurality of bandwidth measurements of a network path between a first device and a second device based on data communication over the path;
   determining a maximum bandwidth of the network path based on the plurality of bandwidth measurements;
   setting a bandwidth cap based on a first percentage of the maximum bandwidth in response to the maximum bandwidth meeting a first criterion, and setting the bandwidth cap based on a second different percentage of the maximum bandwidth in response to the maximum bandwidth meeting a second criterion;
   determining a minimum bandwidth of the network path based at least in part on the plurality of bandwidth measurements;
   determining an encoding rate of an encoder to be between the bandwidth cap and the minimum bandwidth;
   encoding data based on the determined rate; and
   transmitting the encoded data over the network path.

2. The method of claim 1, further comprising setting the bandwidth cap further based on a type of the network.

3. The method of claim 1, further comprising setting the bandwidth cap further based on a screen size of the first device or the second device.

4. The method of claim 1, further comprising setting the bandwidth cap based on one or more of spatial resolution and temporal resolution of a camera of the first device or the second device.

5. The method of claim 1, wherein the first device and the second device each comprise a separate hardware speaker, the method further comprising selecting the percentage based on one or more characteristics of one or more of the hardware speakers.

6. The method of claim 1, further comprising quantizing the plurality of bandwidth measurements, and determining the maximum bandwidth based on the quantized plurality of bandwidth measurements.

7. The method of claim 6, further comprising counting a number of the plurality of bandwidth measurements that fall within each of a plurality of bandwidth ranges, and determining the maximum bandwidth based on the counts.

8. The method of claim 7, further comprising:
   including bandwidth measurements within a predetermined elapsed time in the counts and excluding from the counts bandwidth measurements occurring before the predetermined elapsed time;
   determining first bandwidth measurements of the network path for a first session; and
   determining second bandwidth measurements of the network path for a second session, wherein the plurality of bandwidth measurements includes the first bandwidth measurements and the second bandwidth measurements.

9. The method of claim 1, further comprising setting the bandwidth cap to a first percentage of the maximum bandwidth in response to the maximum bandwidth being within a first range and setting the bandwidth cap to a second lower percentage of the maximum bandwidth in response to the maximum bandwidth being within a second higher range.

10. An apparatus for determining an encoding rate, comprising:
one or more hardware processors; and
a hardware memory, storing instructions that when executed by the one or more hardware processors, configures the one or more hardware processors to perform operations comprising:
determining a plurality of bandwidth measurements of a network path between a first device and a second device based on data communication over the path,
determining a maximum bandwidth of the network path based on the plurality of bandwidth measurements,
setting a bandwidth cap based on a first percentage of the maximum bandwidth in response to the maximum bandwidth meeting a first criterion, and setting the bandwidth cap based on a second different percentage of the maximum bandwidth in response to the maximum bandwidth meeting a second criterion
determining a minimum bandwidth of the network path based at least in part on the plurality of bandwidth measurements,
determining an encoding rate of an encoder to be between the bandwidth cap and the minimum bandwidth,
encoding data based on the determined rate, and
transmitting the encoded data over the network path.

11. The apparatus of claim 10, wherein the hardware memory stores further instructions that configure the one or more hardware processors to perform further operations comprising setting the bandwidth cap further based on a screen size of the first device or the second device.

12. The apparatus of claim 10, wherein the hardware memory stores further instructions that configure the one or more hardware processors to perform further operations comprising setting the bandwidth cap further based on one or more one or more of spatial resolution and temporal resolution of a camera characteristics of the first device or the second device.

13. The apparatus of claim 10, wherein the first device and the second device each comprise a separate hardware speaker, and wherein the hardware memory stores further instructions that configure the one or more hardware processors to perform further operations comprising setting the bandwidth cap further based on one or more speaker characteristics of one or more of the hardware speakers.

14. The apparatus of claim 10, wherein the hardware memory stores further instructions that configure the one or more hardware processors to perform further operations comprising quantizing the plurality of bandwidth measurements, and determining the maximum bandwidth based on the quantized plurality of bandwidth measurements.

15. The apparatus of claim 10, wherein the hardware memory stores further instructions that configure the one or more hardware processors to perform further operations comprising counting a number of the plurality of bandwidth measurements that fall within each of a plurality of bandwidth ranges, and determining the maximum bandwidth based on the counts.

16. The apparatus of claim 15, wherein the hardware memory stores further instructions that configure the one or more hardware processors to perform further operations comprising including bandwidth measurements within a predetermined elapsed time in the counts and excluding from the counts bandwidth measurements occurring before the predetermined elapsed time.

17. A non-transitory computer readable storage medium comprising instructions that when executed cause a hardware processor to perform a method of determining an encoding rate, the method comprising:
determining a plurality of bandwidth measurements of a network path between a first device and a second device based on data communication over the path;
determining a maximum bandwidth of the network path based on the plurality of bandwidth measurements;
setting a bandwidth cap based on a first percentage of the maximum bandwidth in response to the maximum bandwidth meeting a first criterion, and setting the bandwidth cap based on a second different percentage of the maximum bandwidth in response to the maximum bandwidth meeting a second criterion
determining a minimum bandwidth of the network path based at least in part on the plurality of bandwidth measurements;
determining an encoding rate of an encoder to be between the bandwidth cap and the minimum bandwidth;
encoding data based on the determined rate; and
transmitting the encoded data over the network path.

* * * * *